(12) United States Patent
Kitagawa et al.

(10) Patent No.: US 6,297,904 B1
(45) Date of Patent: Oct. 2, 2001

(54) INVERTED CONFOCAL MICROSCOPE

(75) Inventors: Hisao Kitagawa, Kunitachi; Yasushi Aono, Yokohama; Kazuhiko Osa, Hachioji; Yosuke Kishi, Yokohama; Yoshihiro Shimada, Sagamihara, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/400,410

(22) Filed: Sep. 21, 1999

(30) Foreign Application Priority Data

Sep. 22, 1998 (JP) .................................................. 10-268312
Sep. 22, 1998 (JP) .................................................. 10-268313
Sep. 22, 1998 (JP) .................................................. 10-268338

(51) Int. Cl.$^7$ ..................................................... G02B 21/00
(52) U.S. Cl. ........................ 359/368; 359/369; 359/370; 359/372
(58) Field of Search ........................... 359/368, 369, 359/370, 372, 385, 388, 389, 390, 850, 851; 250/458.1, 461.2, 201.3

(56) References Cited

FOREIGN PATENT DOCUMENTS 5-60980   3/1993  (JP) .
7-035986 A  2/1995  (JP) .

OTHER PUBLICATIONS

Article from Nihon Keizai Shimbun, dated Jul. 28, 1997.
Catalogue of Confocal Scanner Unit CSL110, Bulletin 85A7C01–03, published by Yokogawa Electric Corporation, Tokyo, Japan, 1996.

*Primary Examiner*—Mohammad Sikder
(74) *Attorney, Agent, or Firm*—Frishauf, Holtz, Goodman, Langer & Chick, P.C.

(57) ABSTRACT

An inverted microscope is provided that reflects an observation light passing through an image-formation optical system upward using at least one reflection optical system and that leads the observation light to an observation path. The inverted microscope includes a confocal scanner arranged at an image surface position of the image-formation optical system, a light source for applying light onto a sample through the confocal scanner and the image-formation optical system, and a confocal image formation optical system that leads the light passing through the confocal scanner to the sample through the image-formation optical system, returns a return light from the sample to the confocal scanner along a route opposite to that for leading the light to the sample, and obtains a confocal image. A confocal observation optical system is also provided for leading the return light from the sample passing through the optical scanner to the observation optical path.

14 Claims, 12 Drawing Sheets

INVERTED CONFOCAL MICROSCOPE

CROSS REFERENCE TO THE RELATED APPLICATION

Priority is claimed for the present application based on Japanese Patent Application Nos. 98/268338 (filing date: Sep. 22, 1998), 98/268312 (filing date: Sep. 22, 1998) and 98/268313 (filing date: Sep. 22, 1998), the entire contents of which are incorporated herein by reference.

BACKGROUND OF THE INVENTION

The present invention relates to an inverted confocal microscope used for the observation of biological sample as well as for metallic and industrial purposes.

An inverted confocal microscope having an objective lens arranged below the bottom of a culture container, such as a petri dish and a flask, has been conventionally used as a microscope for observing, measuring and imaging the dynamic behavior of a biological sample such as a cultured cell.

The inverted confocal microscope of this type for the study of cell biology involves one disclosed by Jpn. Pat. Appln. KOKAI Publication No. 7-035986. This microscope is designed to have a vertical fluorescent light projection tube for observing a fluorescent light arranged so that the fluorescent image of a live cell into which a fluorescent indicator such as for Ca ions or pH is injected. This microscope includes therein an optical path branching optical system to serve a plurality of image pick-up means such as a photographing still camera, a CCD camera having high space resolution and a high-speed image pick-up device having high time resolution in addition to a device for the observation of a sample, and obtains a plurality of image pick-up optical paths besides an observation optical path.

Meanwhile, as an inverted microscope to provide an image of a live cell at high speed, there is disclosed a microscope in which a confocal scanner unit is detachably attached to a microscope main body by Jpn. Pat. Appln. KOKAI Publication No. 5-60980. The microscope disclosed by 5-60980 employs a confocal disk scanner as a confocal scanner unit. The confocal disk used for confocal disk scanner is constructed by coupling a light condensing disk having multiple pinhole openings into which a plurality of microlenses are embedded, to a pinhole disk having a plurality of pinholes formed to correspond to the multiple pinholes.

Here, each of the pinholes formed in the pinhole disk transmits both an illumination light to a sample and a fluorescent light from the sample, and forms a confocal optical system. With this constitution, the optical disconnect effect of the confocal microscope allows obtaining a high-contrast, clear image. In addition, since the microscope uses a rotary disk scanner, it can observe and pick up an image in a real time manner. It is, in particular, desirable to use this microscope for observing and measuring the physiologically dynamic behavior of a cell by picking up the fluorescent image of a live cell into which a fluorescent indicator for, for example, Ca ions and pH is injected, at high speed.

By the way, the confocal scanner unit as stated above is attached to a microscope main body using a C mount adapter. As a specific way to attach the confocal scanner unit to an inverted microscope is, as shown in, for example, FIG. 1A, the confocal scanner unit is attached to one of three optical takeout ports including a straight barrel 101 on an observation lens barrel 100, a left (or right) side port 103 of a lens barrel 102 and a bottom port 104 below the lens barrel 102. Namely, the confocal scanner unit is attached to one of the three ports and a still camera or a small size CCD camera is attached the remaining two ports. FIG. 1B shows a state in which the confocal scanner unit 105 is attached to the respective optical path takeout ports through the C mount adapter.

However, if the confocal scanner unit 105 is attached to one of the optical path output ports stated above through the C mount adapter or the like, the following disadvantages occur.

First, in case of attaching the confocal scanner unit 105 to the straight barrel 101 above the observation lens barrel 100, an observer's eye point is higher than that during ordinary observation and only a monocular lens can be disadvantageously used. Due to this, at the time of observing a confocal image macroscopically, not only an overstrain affects the observer's posture but also it becomes difficult for the observer to operate the microscope and handle the sample during observation.

In case of attaching the confocal scanner unit 105 to the side port 103 on the left (or right) of the lens barrel 102, the confocal scanner unit 105 is attached at a lower position of the side of the lens barrel, with the result that operability deteriorates. In case of macroscopically observing a confocal image with an eye piece fixed to the confocal scanner unit, in particular, the observer is forced to endure an overstraining posture.

In case of attaching the confocal scanner unit 105 to the bottom port 104 below the lens body 102, the confocal scanner is attached onto the bottom of the lens barrel, i.e., the back side of a table on which the microscope is mounted and the operability of the confocal scanner unit is considerably hampered. The macroscopic observation of a confocal image with the confocal scanner unit is particularly quite difficult to make.

BRIEF SUMMARY OF THE INVENTION

The present invention has been made under the above-stated circumstances. It is, therefore, an object of the present invention to provide an inverted confocal microscope which enables comfortably making macroscopic confocal observation, which has excellent operability and which enables easily comparing a confocal image with a non-confocal image on an observation optical path and a image pick-up optical path.

To attain the above object, according to the main scope of the present invention, there is provided an inverted microscope that reflects an observation light passing through an image-formation optical system upward using at least one reflection light optical system and that leads the observation light to an observation optical path, said inverted microscope comprising:

a confocal scanner arranged at an image surface position of the image-formation optical system;

a light source for applying a light onto a sample through the confocal scanner and the image-formation optical system;

a confocal image formation optical system leading the light passing through the confocal scanner to the sample through the image-formation optical system, returns a return light from the sample to the confocal scanner along a route opposite to that for leading the light to the sample, and obtains a confocal image; and a confocal observation optical system for leading the return light from the sample passing through the confocal scanner to the observation optical path.

With this constitution, even if the confocal scanner is attached to the inverted microscope, an observer can observe a confocal image without changing the height of the observer's eye point.

According to one embodiment, the confocal image formation optical system is provided between the image-formation optical system and a reflection optical system to be freely insertable and detachable and includes a first optical path branching optical system forming a branching optical path; and the confocal scanner is provided on a branching optical path formed by the first optical path branching optical system.

According to one embodiment, the confocal observation optical system comprises:

a second optical path branching optical system provided at the confocal scanner and leading a light passing through the confocal scanner from the scanner to the observation optical system; and a third optical path branching optical system putting the light branched by the second optical system on the observation optical path.

According to one embodiment, the frequency of reflection of light by the first to third optical path branching optical systems is set at even-number times.

According to one embodiment, the confocal scanner is provided on an observation optical path formed by the reflection optical system.

According to one embodiment, the confocal observation optical system comprises:

a first optical path branching optical system provided at the confocal scanner and branching a return light returning from the sample and passing through the confocal scanner so as to deviate the return light from the observation optical path; and a second optical path branching optical system putting again the light branched by the second optical system on the observation optical path.

According to one embodiment, the reflection optical system is formed such that an inclined angle of the reflection optical system can be changed to thereby reflect the return light from the sample on an additional optical path; and the confocal scanner is provided at an image surface position on the additional optical path.

According to one embodiment, the confocal scanner is provided below the reflection optical system; and the reflection optical system is formed to deviate from the optical path of the return light from the sample.

According to one embodiment, the confocal scanner and the first and second optical path branching optical systems are detachably attached on an outer surface of a microscope main body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principle of the invention.

DETAILED DESCRIPTION OF THE INVENTION

Now, embodiments according to the present invention will be described with reference to the accompanying drawings.

First Embodiment

Figure 2:
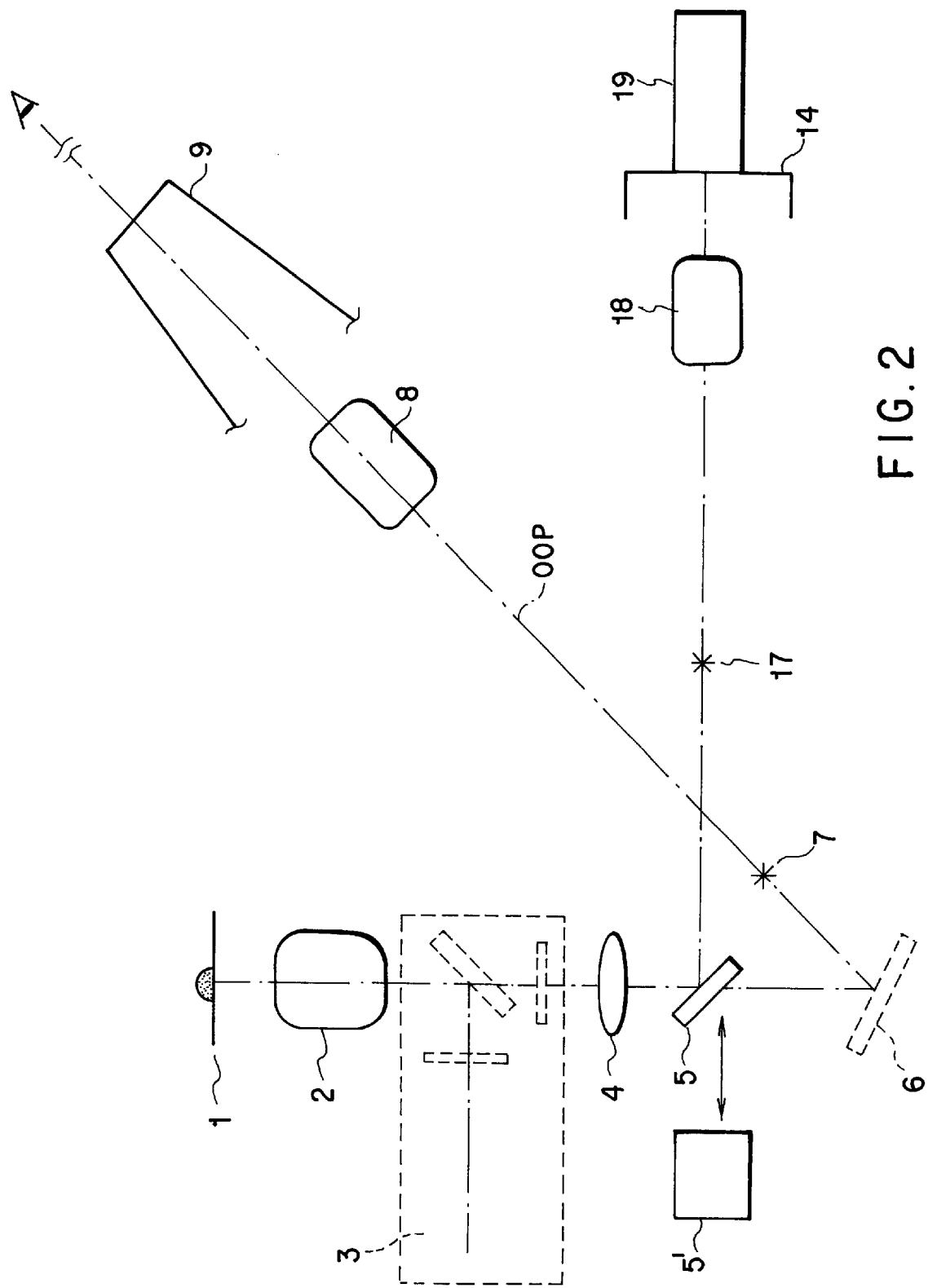
FIG. 2 shows the constitution of an inverted microscope before a confocal scanner unit is attached thereto in the first embodiment according to the present invention.
Figure 3:
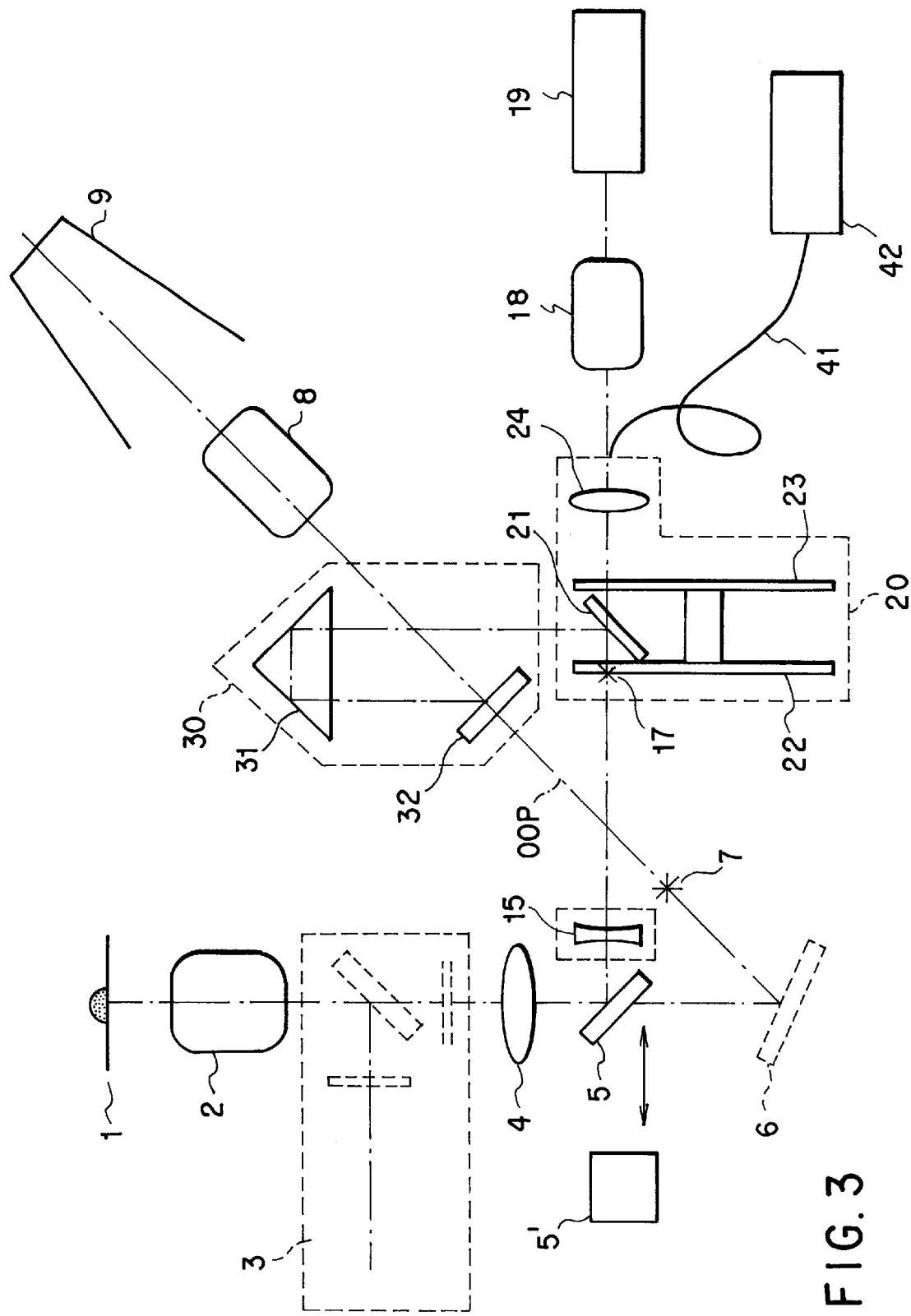
FIG. 3 shows the constitution of the inverted microscope after the confocal scanner unit has been attached thereto in the first embodiment.

FIGS. 2 and 3 are schematic block diagrams showing an inverted confocal microscope in the first embodiment according to the present invention. FIG. 3 shows a state in which a confocal scanner unit and an optical path switching unit, which are the important parts of the present invention, are attached into a microscope main body. FIG. 2 shows a state in which these units are detached.

First, description will be given to the basic constitution of an inverted confocal microscope applied to this embodiment with reference to FIG. 2.

In ordinary observation with this microscope, a sample 1 is illuminated by a transmitted illumination light source (first light source) which is not shown in FIG. 2 and provided above the sample 1. The light transmitted by the sample 1 is led by a mirror 5 through an objective 2 and an image-forming lens 4 to an image pick-up optical path on the right in FIG. 2, i.e., toward the front of a microscope and a sample image is picked up on an image surface 17.

The sample image on the image surface 17 is projected onto the image pick-up surface of a CCD camera 19 attached to an image pick-up device mounting mount 14 at the front side of a microscope main body and picked up by the CCD camera 19.

Meanwhile, the mirror 5 is constituted to be switchable to, for example, a transmission prism 5'. If the prism 5' is inserted, light transmitted by the sample 1 is transmitted by an objective lens 2 and the image-formation lens 4 and then transmitted by the transmission prism 5' in perpendicular direction. The light transmitted by the transmission prism 5' is led to an observation optical path OOP toward off to the upper left of a mirror 6, i.e., off to above the front of the inverted microscope and a sample image is formed on an image surface 7.

Figure 1B:
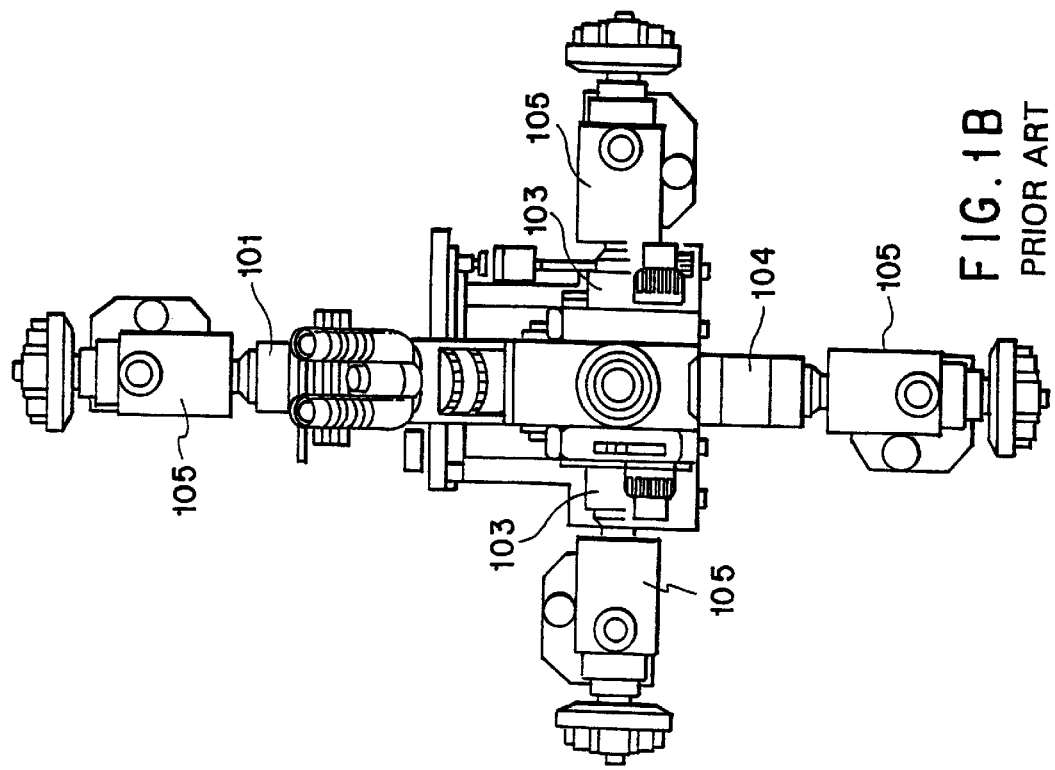
FIGS. 1A and 1B are schematic diagrams showing a conventional inverted microscope.
Figure 1A:
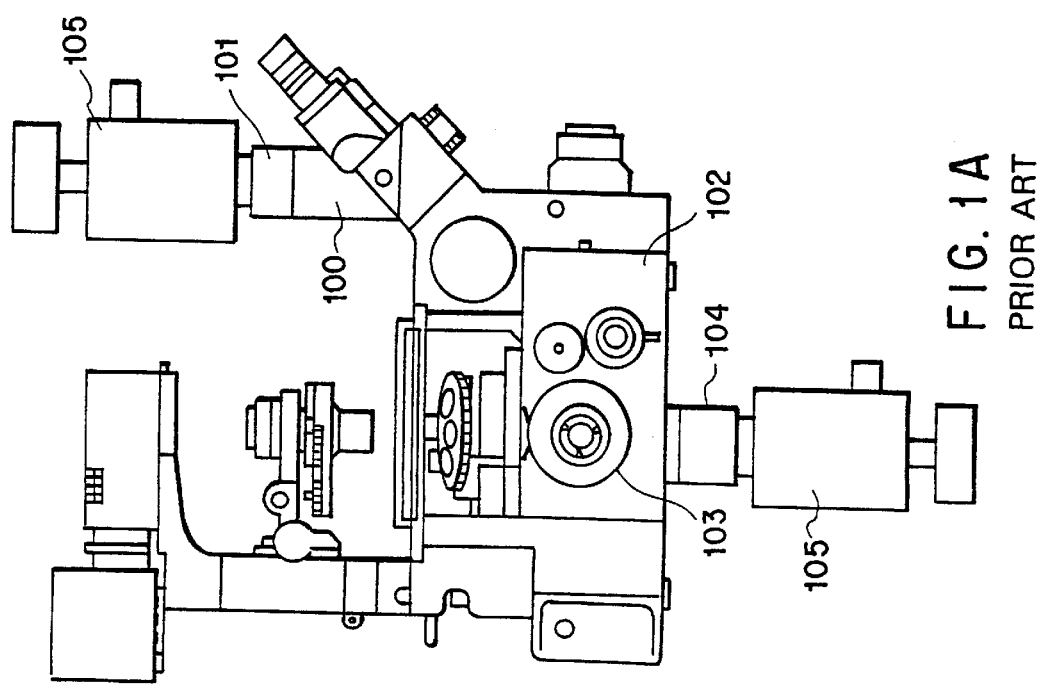

The sample image on the image surface 7 is led to a lens barrel 9 by a relay lens 8 provided on the observation optical path OOP and projected on the image surface of an eye piece which is not shown in FIGS. 1A and 1B. As a result, an observer can macroscopically observe the sample image at an angle of depression of 45 degrees from the front of the microscope.

By selectively switching over the mirror 5 to/from the transmission prism 5' as stated above, it is possible to arbitrarily select whether to pick up a sample image on the image surface 17 by the CCD camera or to macroscopically observe the sample image on the image surface 7.

FIG. 3 shows a state in which a confocal scanner unit 20 and an optical path switching unit 30 are detachably inserted into the microscope main body of the inverted confocal microscope shown in FIG. 2.

The confocal scanner unit 20 is provided, with one surface of a pinhole disk 22 coincident with the position of the image surface 17 on the image pick-up optical path, and connected to a laser light source 42 through a laser fiber 41. The laser light source 42 is arranged on the floor distant from a table on which the microscope is mounted so as to prevent the transfer of vibration, heat and the like.

A laser light emitted from the laser light source 42 is led onto one end face of the laser fiber 41 of a single mode by light condensing means which is not shown in FIG. 3 and led to the confocal scanner unit 20 from the other end face of the laser fiber 41. The laser light emitted from the end face of the laser fiber 41 is converted to a parallel light by a collimator lens 24 and then made incident on a light condensing disk 23 on which a microlens array is formed.

The microlens pattern on the light condensing disk 23 and the pinhole pattern on the pinhole disk 22 are formed using a semiconductor process and the sameness of these patterns is ensured with high accuracy. When the light condensing disk 23 is coupled to the pinhole disk 22, they are adjusted to be aligned to each other. The laser light condensed by a plurality of microlenses provided on the light condensing disk 23 is constituted to be transmitted by a plurality of corresponding pinholes on the pinhole disk 22.

As stated above, the confocal scanner unit 20 is arranged, with the pinhole disk 22 coincident with the image surface 17 of the image pick-up surface. With this constitution, the light transmitted by the pinholes of the pinhole disk 22 is condensed on the sample 1 through the mirror 5, the image-formation lens 4 and the objective lens 2.

A fluorescent indicator is injected into a cell used as the sample 1. The indicator is excited after being applied with a laser light and then emits a fluorescent light. The fluorescent light emitted from the sample 1 returns to the pinholes of the pinhole disk 22 through the objective lens 2, the image-formation lens 4 and the mirror 5, thereby forming a confocal optical path. In this state, if the pinhole disk 22 and the light condensing disk 23 coupled to each other are rotated by a motor which is not shown in FIG. 3, a scanned confocal image can be obtained.

The fluorescent light emitted from the sample 1 and transmitted by the pinhole disk 22 is reflected by a dichroic mirror 21, separated from a laser optical path and introduced to an optical path switching unit 30 provided on the observation optical path OOP. The optical path switching unit 30 causes the introduced fluorescent light to be reflected by a reflection prism 31 twice and reflected once by a mirror 32, thereby to be led onto the observation optical path OOP. By doing so, the fluorescent light emitted from the sample 1 is lead to an observation lens barrel 9 by a relay lens 8 on the observation optical path OOP and an image is formed again and projected on the image surface of the eye piece which is not shown in FIG. 3. Thus, the observer can macroscopically observe the confocal image of the sample 3 with an angle of depression of 45 degrees from the front of the microscope.

With this constitution, it is possible to obtain a confocal microscope which can detachably attach the confocal scanner unit 20 and which can be handled in a state in which the confocal scanner unit 20 is attached thereto, with the same operability as that when the confocal scanner unit 20 is not attached.

Namely, in this embodiment, a confocal image is obtained by arranging the pinhole disk 22 of the confocal scanner unit 20 to be coincident with the image surface 17 on the image pick-up path and the obtained confocal image is put on the observation optical path OPP through the optical path switching unit 30. Therefore, if the optical path switching unit 30 is inserted into the observation optical path OPP, a confocal image can be observed. If switching over the mirror 5 to the transmission prism 5' and pulling the optical path switching unit 30 out of the optical path, an ordinary fluorescent image or a transmitted image can be observed. In other words, an observer can easily switch a macroscopically observed image to either a confocal image or a non-confocal image and select one of the confocal and non-confocal image. At that moment, the observation lens barrel 9 is the same as before and the eye point does not change either. Thus, the observer can maintain a most comfortable posture during observation and can operate the microscope and handle the sample while macroscopically observing the confocal image.

Further, since the confocal image is led to the observation lens barrel 9 by a total of four (even-number times) reflections, i.e., once by the confocal scanner unit 20 and three times by the optical path switching unit 30, the confocal image is not turned the other way from the non-confocal image and the observed image can be easily compared and examined.

Moreover, since the confocal scanner unit 20 is detachably provided at the microscope main body, it is possible to detach the confocal scanner unit 20 and to provide an image pick-up path for picking up an ordinary fluorescent image or a transmitted image.

If an image-formation position correction lens 15 (see FIG. 3) is arranged to be insertable into the image pick-up optical path as necessary when the confocal scanner unit 20 and the optical path switching unit 30 are inserted into the optical path, the positional relationship between the image surface 17 on the image pick-up optical path and the pinhole disk 22 and/or that between the image surface 17 on the image pick-up optical path and the relay lens 8 on the observation optical path are modified to thereby allow the image-formation relationship during the switch-over of the optical path to be maintained. Likewise, by switching over the relay lens 8 or adding a correction lens on the observation optical path, the image-formation relationship during the switch-over of the optical path can be maintained.

In this embodiment, the CCD camera 19 has been taken as an example of an image pick-up device. Other image pick-up devices, such as a still camera, can be attached to the microscope C mount adapter 14 (to be referred to as 'microscope adapter' hereinafter) provided in front of the microscope according to usage. Furthermore, while the image-formation function of the optical system during the radiation of transmitted light has been described in this embodiment, it is possible to insert a vertical fluorescent light projection tube 3 and to make vertical fluorescent light. The same thing is true for the functions of the observation and image pick-up paths. Additionally, a trinocular lens barrel provided with a straight barrel for image pick-up instead of a binocular lens barrel for macroscopic observation can be attached as the observation lens barrel 9. In that case, an image pick-up device such as a CCD camera or a still camera can be attached to the straight barrel for picking up an image according to usage and a confocal image can be picked up.

Second Embodiment

Next, the second embodiment according to the present invention will be described.

Figure 4:
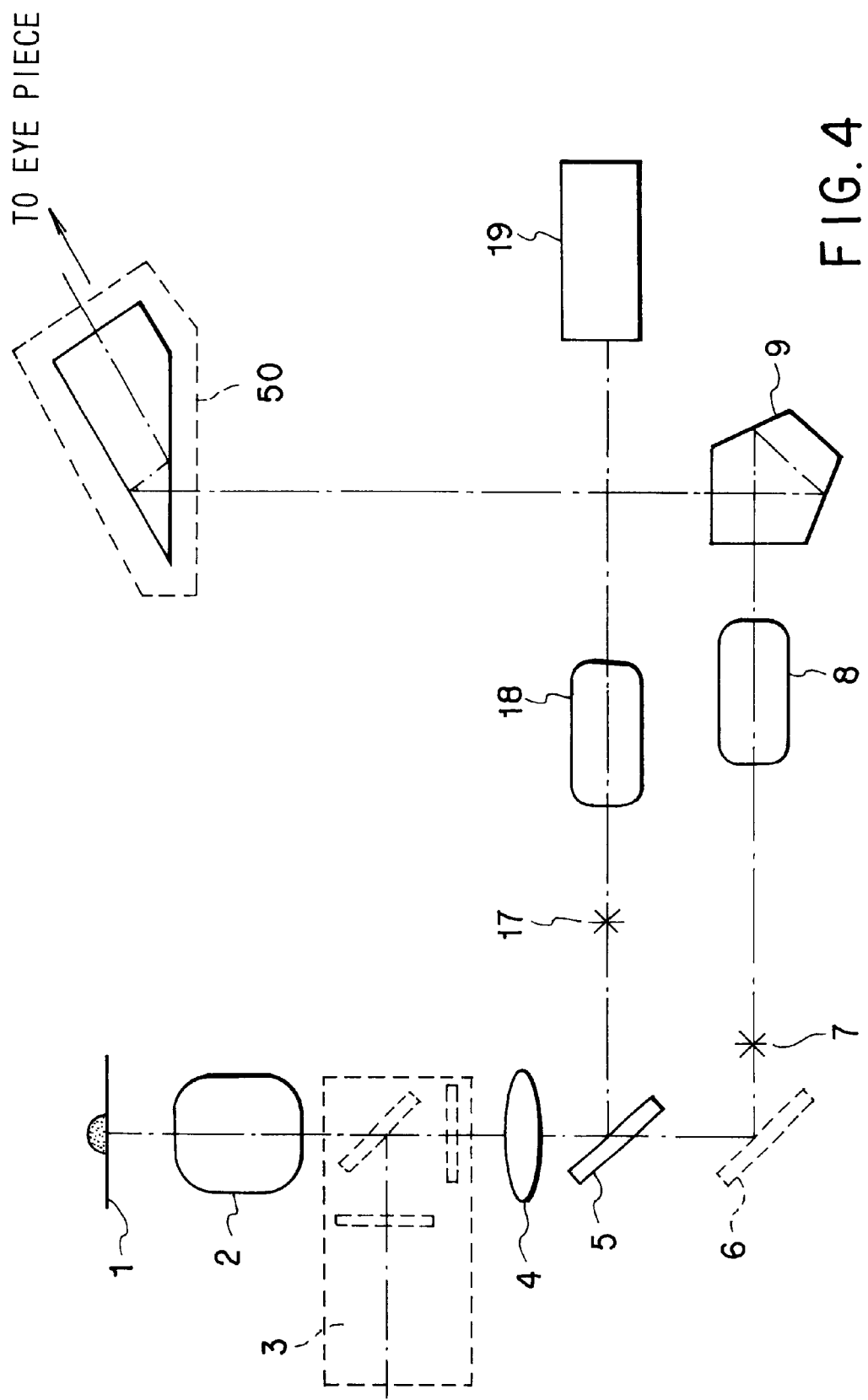
FIG. 4 shows the constitution of an inverted microscope before a confocal scanner unit is attached thereto in the second embodiment according to the present invention.
Figure 5:
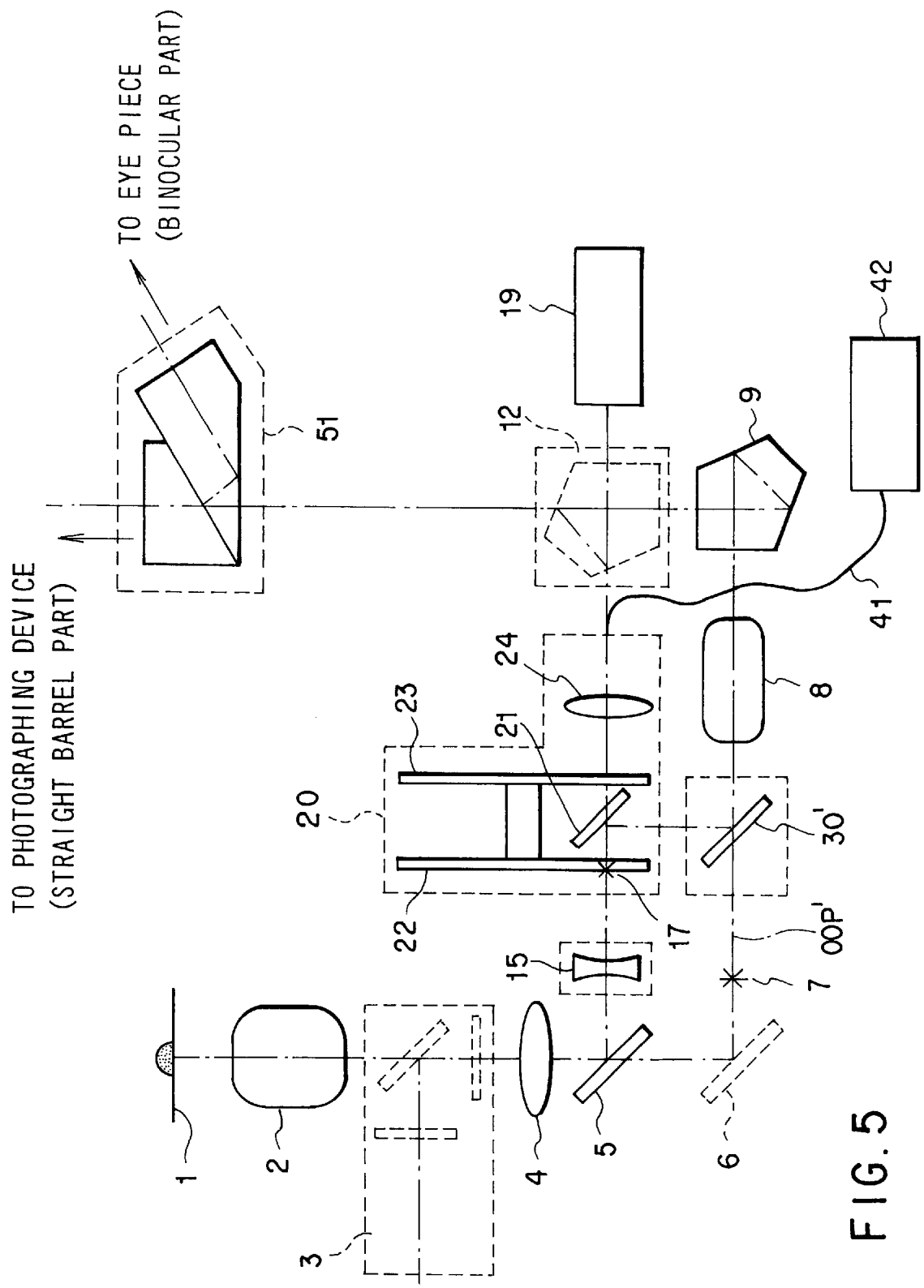
FIG. 5 shows the constitution of the inverted microscope after the confocal scanner unit in the second embodiment has been attached thereto.

FIG. 4 shows the basic constitution of an inverted confocal microscope applied to the second embodiment according to the present invention. FIG. 5 shows that a confocal scanner unit 20 and an optical path switching unit 30' which are important parts of the present invention are arranged to be insertable and detachable in the inverted confocal microscope. It is noted that the same constituent elements as those in the first embodiment are denoted by the same reference symbols and the detailed description of the elements will be not given herein.

The observation optical path OOP in the first embodiment stated above is called a "V-shaped optical path" since the path is folded off to the right by the mirror 6. In the second embodiment, by contrast, an observation optical path OOP' is called "U-shaped optical path" since it is folded horizontally by a mirror 6 shown in FIG. 4 and then folded upward by a pentaprism 9.

In this embodiment, the reason for reflecting fluorescent light using the pentaprism 9 twice is as follows. While it is necessary to match the direction of a sample image with that of an image seen from the above so as to facilitate observer's operating positioning the sample in case of observing a biological sample from the bottom of a culture container such as a petri dish and a flask, the frequency of folding the optical path needs to amount to odd-number times.

A confocal scanner unit 20 is arranged in the microscope so that the pinhole disk 22 coincides with the image surface 17 on an image pick-up optical path. With this constitution, the light transmitted by the pinholes of the pinhole disk 22 is condensed on the sample 1 trough the mirror 5, image-formation lens 4 and objective lens 2.

The confocal scanner unit 20 is provided, with one surface of a pinhole disk 22 coincident with the position of the image surface 17 on the image pick-up optical path, and connected to a laser light source 42 through a laser fiber 41. The laser light source 42 is arranged on the floor distant from a table on which the microscope is mounted so as to prevent the transfer of vibration, heat and the like.

A fluorescent light emitted from the sample 1 returns to the pinholes of the pinhole disk 22 through the objective lens 2, image-formation lens 4 and mirror 5, thereby forming a confocal optical path.

In this state, the pinhole disk 22 and the light condensing disk 23 coupled to each other are rotated by a motor which is not shown in FIG. 5, whereby a scanned confocal image can be obtained. The fluorescent light emitted from the sample 1 and transmitted by the pinhole disk 22 is reflected by a dichroic mirror 21, separated from a laser optical path, directed downward in the drawing, reflected by a mirror 30', led to the observation optical path OOP', passing through a relay lens 8 on the observation optical path OOP', folded upward by the pentaprism 9 and led to a trinocular lens barrel 51. Thereafter, the fluorescent light is projected on the image surface of an eye piece (not shown) arranged at a binocular part or on the image surface of an image pick-up device connected to a straight barrel. As a result, an observer can macroscopically observe the confocal image of the sample 1 with an angle of depression 30 degrees from the binocular lens barrel on the front face of the microscope. Also, as necessary, a confocal image can be picked up by an image pick-up device attached to the straight barrel part of the trinocular barrel 51.

According to the second embodiment, therefore, it is possible to obtain a confocal microscope to which the confocal scanner unit 20 is detachably attached and which can be handled in a state in which the confocal scanner unit 20 is attached thereto with the same operability as that when the unit 20 is not attached.

It is noted that if the pentaprism 12 is inserted into the cross portion between the image pick-up optical path and the observation optical path as indicated by a broken line in FIG. 5, the confocal image can be led to the CCD camera 19 and picked up by the CCD camera 19. That is, the confocal image can be picked up by the image pick-up device 19 attached to the straight barrel part of the trinocular barrel or by the image pick-up device provided on the front face of the microscope according to usage. Further, the confocal scanner unit 20 is detachably provided at the microscope main body and can be switched over to a relay lens 18 on the image pick-up optical path. Due to this, by detaching the confocal scanner unit 20 and switching over to the relay lens 18, it is possible to easily recover an image pick-up path for picking up an ordinary fluorescent image or transmitted image by the CCD camera 19 in front of the microscope.

Moreover, if an image-formation position correction lens 15 is detachably arranged on the image pick-up path as necessary when the confocal scanner unit 20 and the mirror 30' are inserted on the optical path, the positional relationship between the image surface 17 on the image pick-up optical path and the pinhole disk 22 and/or that between the image surface 17 on the image pick-up optical path and the relay lens 8 on the observation optical path can be modified to thereby maintain the image formation relationship during the switch-over of the optical path. Likewise, the image formation relationship during the switch-over of the optical path can be maintained by switching over the relay lens 8 or adding a correction lens on the observation optical path.

Third Embodiment

Figure 6:
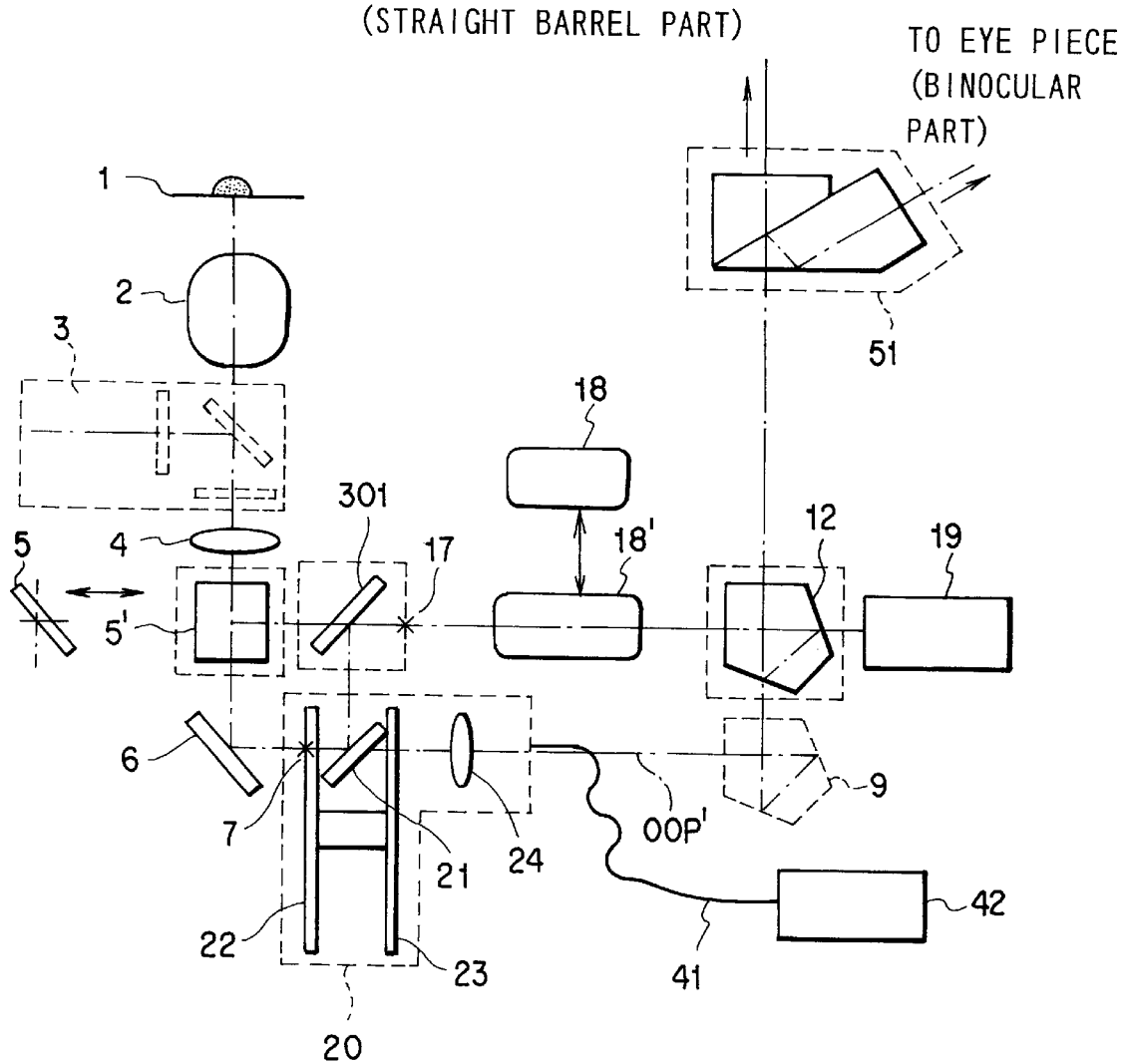
FIG. 6 shows the constitution of an inverted microscope after a confocal scanner unit is attached thereto in the third embodiment according to the present inventing

Next, the third embodiment according to the present invention will be described with reference to FIG. 6. It is noted that the same constituent elements as those in the second embodiment (FIG. 5) are denoted by the same reference symbols and the detailed description of the elements will not be given herein.

The third embodiment is applied to an inverted confocal microscope having a "U-shaped optical path" as in the case of the second embodiment. The confocal scanner 20 is inserted into the image pick-up optical path in the second embodiment, whereas a confocal scanner 20 is inserted into an observation optical path OOP' in the third embodiment. Following this, an optical path switching unit 30' is inserted into the image pick-up optical path.

If a confocal observation is made with this microscope, a transmission prism 5' is arranged to be switchable on the optical path between an image-formation lens 4 and a mirror 6. A pentaprism 12 is inserted at a crossing between the laser optical path and the observation optical path OOP'.

If the sample 1 is applied with a laser light through the confocal scanner unit 20 by operating a laser 42, a fluorescent light from the sample 1 returns to the confocal scanner unit 20. In this state, the confocal scanner unit 20 is rotated by a motor which is not shown in FIG. 5, whereby a scanned confocal image can be obtained. The fluorescent light emitted from the sample 1 and transmitted by a pinhole disk 22 is reflected by a dichroic mirror 21, separated from the laser optical path and led to the mirror 30'. The fluorescent light reflected by this mirror 30' passes through a relay lens 18', folded upward by the pentaprism 12, led to a trinocular barrel 51 and projected on the image surface of an eye piece which is not shown in FIG. 4 and arranged at a binocular part or on the image surface of an image pick-up device connected to the straight barrel part. As a result, an observer can macroscopically observe the confocal image of the sample 1 at an angle of depression of 30 degrees from the binocular barrel part on the front face of the microscope. Also, as necessary, the confocal image can be picked up by an image pick-up device attached to the straight barrel part of the trinocular barrel.

If an ordinary fluorescent image is picked up by a CCD camera 19, the transmission prism 5' is switched over to a mirror 5 and the mirror 30' is pulled out of the optical path. Then, the relay lens 18' on the image pick-up optical path is switched over to a relay lens 18 and a pentaprism 12 is inserted into the observation optical path. By doing so, an ordinary fluorescent image or transmitted image can be picked up by the CCD camera 19 in front of the inverted microscope.

With this constitution, it is possible to obtain a microscope which is detachably attached to the confocal scanner unit 20 and can be handled in a state in which the unit 20 is attached thereto, with the same operability as that when the unit 20 is not attached.

In the above embodiment, the pentaprism 12 is prepared independently of the pentaprism 9 and arranged to be insertable and detachable. Alternatively, a slide mechanism for moving the pentaprism 9 to the position of the pentaprism 12 may be provided to use the pentaprism 9 as a substitute for the pentaprism 12.

Moreover, the confocal scanner unit 20 is constituted to be detachable and switchable over to the relay lens on the observation optical path, the scanner unit 20 is detached and the relay lens is inserted instead, whereby the function of an observation optical path for observing an ordinary fluorescent image or transmitted image with an eye piece attached to the binocular of the trinocular barrel 51 of the inverted microscope can be recovered.

Fourth Embodiment

Figure 7:
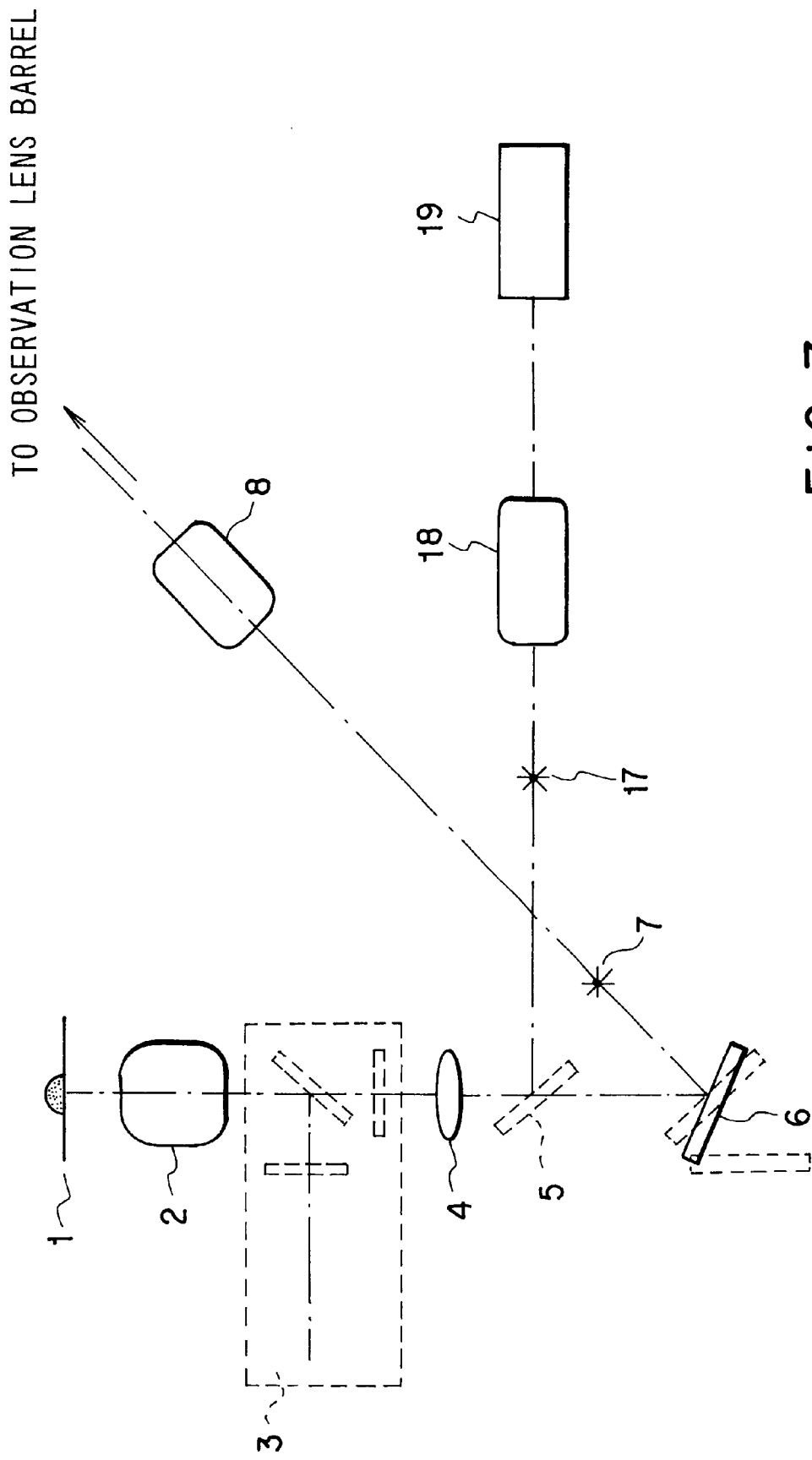
FIG. 7 shows the constitution of an inverted microscope after a confocal scanner unit has been attached thereto in the fourth embodiment according to the present invention.
Figure 8:
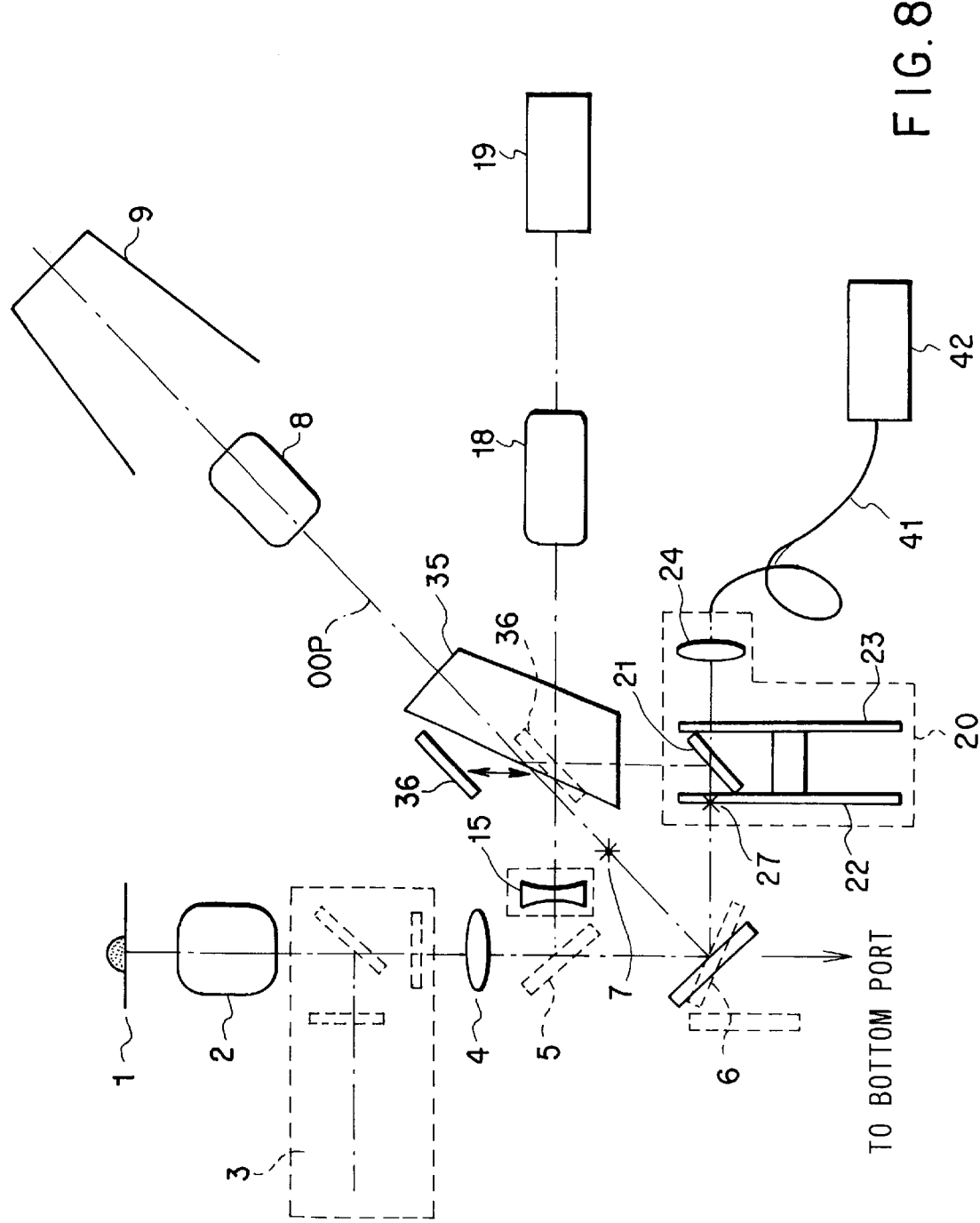
FIG. 8 shows the constitution of the inverted microscope after the confocal scanner unit has been attached thereto in the fourth embodiment.

FIGS. 7 and 8 show the basic constitution of an inverted confocal microscope applied to the fourth embodiment according to the present invention. In the fourth embodiment as in the case of the preceding first embodiment, an inverted confocal microscope having a "V-shaped optical path" is used. In this embodiment, the angle of an optical folding mirror 6 can be changed. The angle of the optical path folding mirror 6 can be changed to three angles, i.e., −22.5 degrees, −45 degrees (indicated by a broken line) and −90 degrees (indicated by a broken line).

FIG. 8 shows a state in which an optical unit group (15, 20, 35, 36 and 42) forming the important parts of the present invention are inserted into the inverted microscope shown in FIG. 7.

In the fourth embodiment, a confocal scanner unit 20 is arranged to be insertable and detachable into/from the image surface 27 of an optical path formed by the optical path folding mirror 6 with the angle set at −45 degrees. An optical path folding prism 35 is arranged to be insertable and detachable into/from an observation optical path OOP while the angle of the mirror 6 is set at −22.5 degrees. The optical path folding prism 35 can be switched over to a mirror 36.

In this state, a laser light emitted from a laser light source 42 passes through the confocal scanner unit 20 and is applied onto a sample 1. A fluorescent light from the sample 1 returns to the pinholes of a pinhole disk 22 through an objective lens 2, an image-formation lens 4 and a mirror 6, thereby forming a confocal optical path. In this state, if the confocal scanner unit 20 is rotated by a motor which is not shown in FIG. 8, a scanned confocal image can be obtained. The fluorescent light emitted from the sample 1 and transmitted by the pinhole disk 22 is reflected upward by a dichroic mirror 21, separated from a laser optical path and made incident on the optical path folding prism 35 shown upward in FIG. 8. After the fluorescent light from the confocal scanner unit 20 is reflected within the prism 35, the fluorescent light is led to the observation optical path OOP having an angle of depression of 45 degrees aslant and led to an observation lens barrel 9 through a relay lens 8. Thereafter, an image is formed again on the image surface of an eye piece which is not shown in FIG. 8 and projected onto the image surface thereof. As a result, an observer can macroscopically observe the confocal image of the sample 1 with an angle of depression of 45 degrees from the front surface of the microscope.

In this embodiment, the optical path folding prism 35 is arranged to be insertable and detachable. If the angle of the optical path folding mirror 6 is set at −45 degrees, with the optical path folding prism 35 inserted in the optical path, a confocal image can be observed. If the optical path folding prism 35 is pulled out of the optical path and the angle of the optical path folding mirror 6 is set at −22.5 degrees, an ordinary fluorescent image or transmitted image can be observed.

If the angle of the optical path folding mirror 6 is set at −90 degrees, a light from the objective lens 2 can be led downward in FIG. 8, i.e., to the bottom of the microscope, so that an ordinary fluorescent image or transmitted image can be picked up by an image pick-up device attaching to a bottom port which is not shown in FIG. 8.

Furthermore, if the mirror 36 instead of the optical path folding prism 35 is inserted and the angle of the optical path folding mirror 6 is set at −45 degrees, the light reflected by the dichroic mirror 21 can be led into the image pick-up optical path and a confocal image can be picked up by a CCD camera 19. In that case, however, the distance from the position of an image on the image pick-up optical path to the CCD camera 19 in case of inserting the mirror 5 differs greatly from the distance from the image surface 27 on the third optical path (i.e., the pinhole disk 22) to the CCD camera 19. This makes it necessary to add an additional lens, which is not shown, relative to the relay lens 18 on the image pick-up optical path to correct image-formation relationship or to switch over the relay lens 8 on the image pick-up path to another relay lens (not shown) to maintain the image-formation relationship. It goes without saying that the relay lens 8 on the observation optical path should be contrived as well.

With the above-stated constitution, therefore, an observer can easily switch over a microscopically observed image to either a confocal image or a non-confocal image and select one of the confocal and non-confocal image. At this moment, an observation lens barrel is the same and the eye point does not change, so that the observer can maintain the most comfortable posture during observation and can comfortably operate the microscope and handle the sample while macroscopically observing a confocal image.

Moreover, the confocal image is led to the observation barrel by a total of two (even-number times) reflections; i.e., once by the confocal scanner unit 20 and once by the optical path folding prism 35. Due to this, the confocal image is not turned the other way from the non-confocal image, thereby facilitating comparing and examining the images.

Further, the confocal scanner unit 20 is detachably attached to the microscope main body. Due to this, it is possible to detach the confocal scanner unit 20 and to recover the function of the image pick-up optical path so as to pick up an ordinary fluorescent image or transmitted image.

Fifth Embodiment

Figure 9:
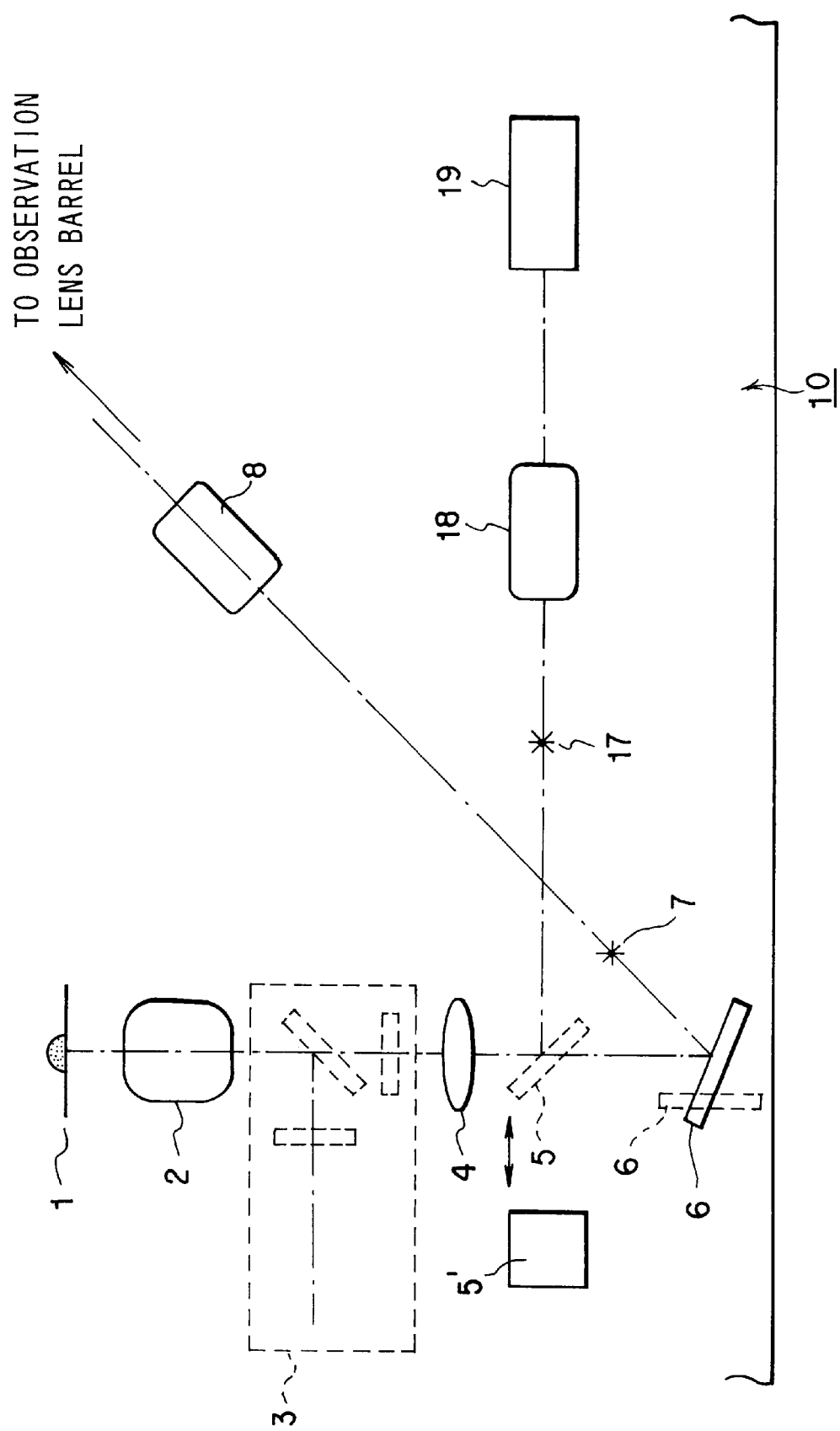
FIG. 9 shows the constitution of an inverted microscope before a confocal scanner unit has been attached thereto in the fifth embodiment according to the present invention.
Figure 10:
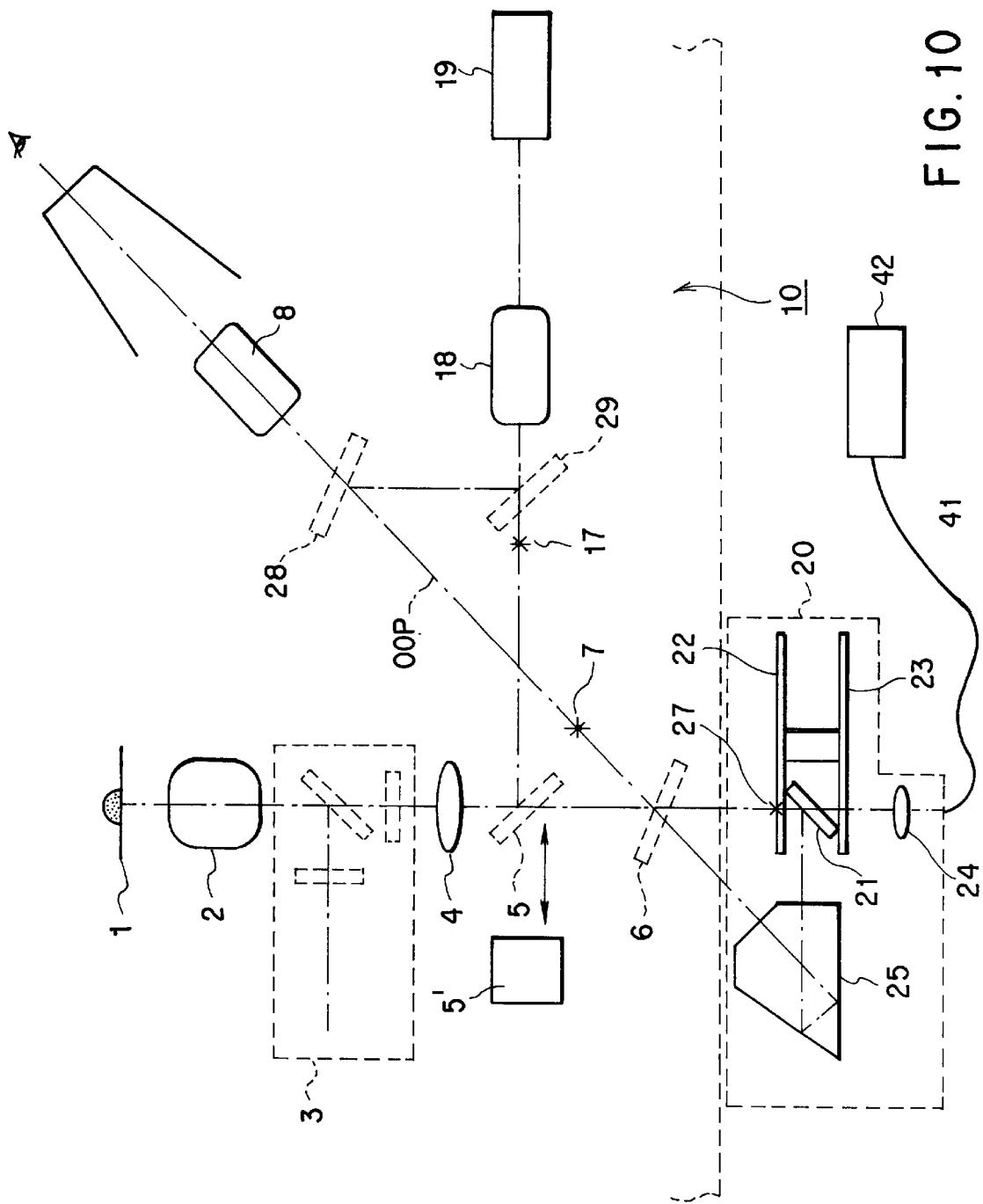
FIG. 10 sows the constitution of the inverted microscope after the confocal scanner unit has been attached in the fifth embodiment.

FIGS. 9 and 10 show an inverted microscope in the fifth embodiment according to the present invention.

The confocal scanner unit 20 is provided within the microscope main body 10 in all of the preceding first to fourth embodiments, whereas the unit 20 is attached outside the microscope main body 10 in the fifth and the following embodiments. It is noted that the same constituent elements shown in FIGS. 9 and 10 as those in the preceding embodiments already described above are denoted by the same reference symbols and that the detailed description of those elements will not be given herein.

FIG. 9 shows the basic constitution of a microscope applied to this embodiment. In this embodiment, the mirror 6 is designed to rotate by 90 degrees and deviate from an observation optical path OOP. In this state, a confocal scanner unit denoted by reference numeral 20 is attached to the bottom of the microscope main body 10 as shown in FIG. 10. This scanner unit 20 consists of a pinhole disk 22 and a light condensing lens 23 for forming a confocal optical system as well as a prism 25 for returning a confocal image to the observation optical path OOP and leading the confocal image to an observation lens barrel 9.

If the mirror 6 is detached from the optical path while a mirror 5 is switched over to a transmission prism 5', an image-formation optical path formed by an objective lens 2 and an image-formation lens 4 goes outside from a microscope adapter which is not shown and arranged on the bottom of the microscope main body 10 right under the objective lens 2 and forms a sample image on an image surface 27. The pinhole disk 22 of the confocal scanner unit 20 is arranged so that the position of the disk 22 coincides with that of the image surface 27.

A laser light emitted from a laser light source 42 passes through the confocal scanner unit 20 and applied onto a sample 1. A fluorescent light from the sample 1 returns to the pinholes of the pinhole disk 22 and forms a confocal optical path. In this state, the pinhole disk 22 and the light condensing disk 23 coupled to each other are rotated by a motor which is not shown in FIG. 10, whereby a scanned confocal image can be obtained.

The fluorescent light emitted from the sample 1 and transmitted by the pinhole disk 22 is separated from a laser optical path by a dichroic mirror 21 fixed between the pinhole disk 22 and the light condensing disk 23 and directed leftward in FIG. 10. The fluorescent light is reflected by the optical path folding prism 25 twice, led to the observation optical path OOP shown off to the right in FIG. 10 and provided within the microscope main body 10, and led to the observation lens barrel 9 by the relay lens 8 on the observation optical path OOP. By doing so, an sample image is formed again on and projected onto the image surface of an eye piece which is not shown in FIG. 10. An observer can, therefore, macroscopically observe the confocal image of the sample 1 at an angle of depression of 45 degrees from the front surface of the microscope.

In that case, the optical path length from the image surface 7 on the observation optical path to the image surface of the eye piece (not shown) greatly differs from that from the image surface 27 outside of the microscope main body 10 to the image surface of the eye piece (not shown). This makes it necessary to add a correction lens which is not shown in FIG. 10 relative to the relay lens 8 on the observation optical path and to correct an image-formation relationship or to switch over the relay lens 8 on the observation optical path to another relay lens to maintain the image-formation relationship.

With this constitution, it is possible to obtain a microscope to which the confocal scanner unit 20 can be detachably attached and which can be handled in a state in which the scanner unit 20 is attached thereto with the same operability as that when the scanner 20 is not attached.

That is to say, since the pinhole disk 22 of the confocal scanner unit 20 is arranged to be coincident with the image surface 27 outside the bottom of the microscope main body 10 and to be detachable from the optical path of the optical path folding mirror 6, a confocal image can be observed if the mirror 6 is detached from the optical path and an ordinary fluorescent image or transmitted image can be observed if the mirror 6 is inserted into the optical path. In other words, the observer can easily switch over a microscopically observed image to either a confocal image or a non-confocal image and select one of the confocal and non-confocal images. At this moment, the observation barrel 9 is the same and the eye point does not change, so that the observer can maintain the most comfortable posture during observation and can comfortably operate the microscope and handle the sample.

Moreover, since the confocal scanner unit 20 is detachably provided outside of the microscope main body 10, the add-on of the confocal scanner unit 20 can be easily conducted and the observer can easily employ the microscope.

Furthermore, since the confocal image is reflected by the confocal scanner unit 20 three times and led to the observation lens barrel and the non-confocal image is led to the observation barrel through the mirror 6 after the non-confocal image is reflected by the mirror 6 once, the confocal and non-confocal images are not turned the other way from each other. Thus, the confocal image and the non-confocal images can be easily compared and examined.

Additionally, the confocal scanner unit 20 is detachably attached to the microscope adapter (not shown) at the bottom of the microscope main body 10. Due to this, the confocal scanner unit 20 can be detached from the optical path to thereby provide an image pick-up optical path for picking up an ordinary fluorescent image or transmitted image.

If the optical path from the confocal scanner unit 20 is led to the observation optical path OOP and, at the same time, the mirrors 28 and 29 serving as the second optical path switching means are controlled and inserted into the observation optical path OOP and the image pick-up optical path, respectively, then the optical path from the confocal scanner unit 20 can be led from the observation optical path OOP to the image pick-up optical path. This makes it possible to project the confocal image onto the image surface of a CCD camera 19 provided in front of the microscope and attached to the microscope adapter (not shown) and to pick up the confocal image by the camera 19. In that case, the optical path length from the image surface 17 on the image pick-up optical path to the image surface of the CCD camera 19 differs greatly from that from the image surface 27 outside of the microscope main body 10 to the image surface of the CCD camera 19. This makes it necessary to add a correction lens relative to the relay lens 18 on the image pick-up optical path and correct an image-formation relationship or switch over the relay lens 18 on the observation optical path to another relay lens to thereby maintain the image-formation relationship.

Sixth Embodiment

Figure 11:
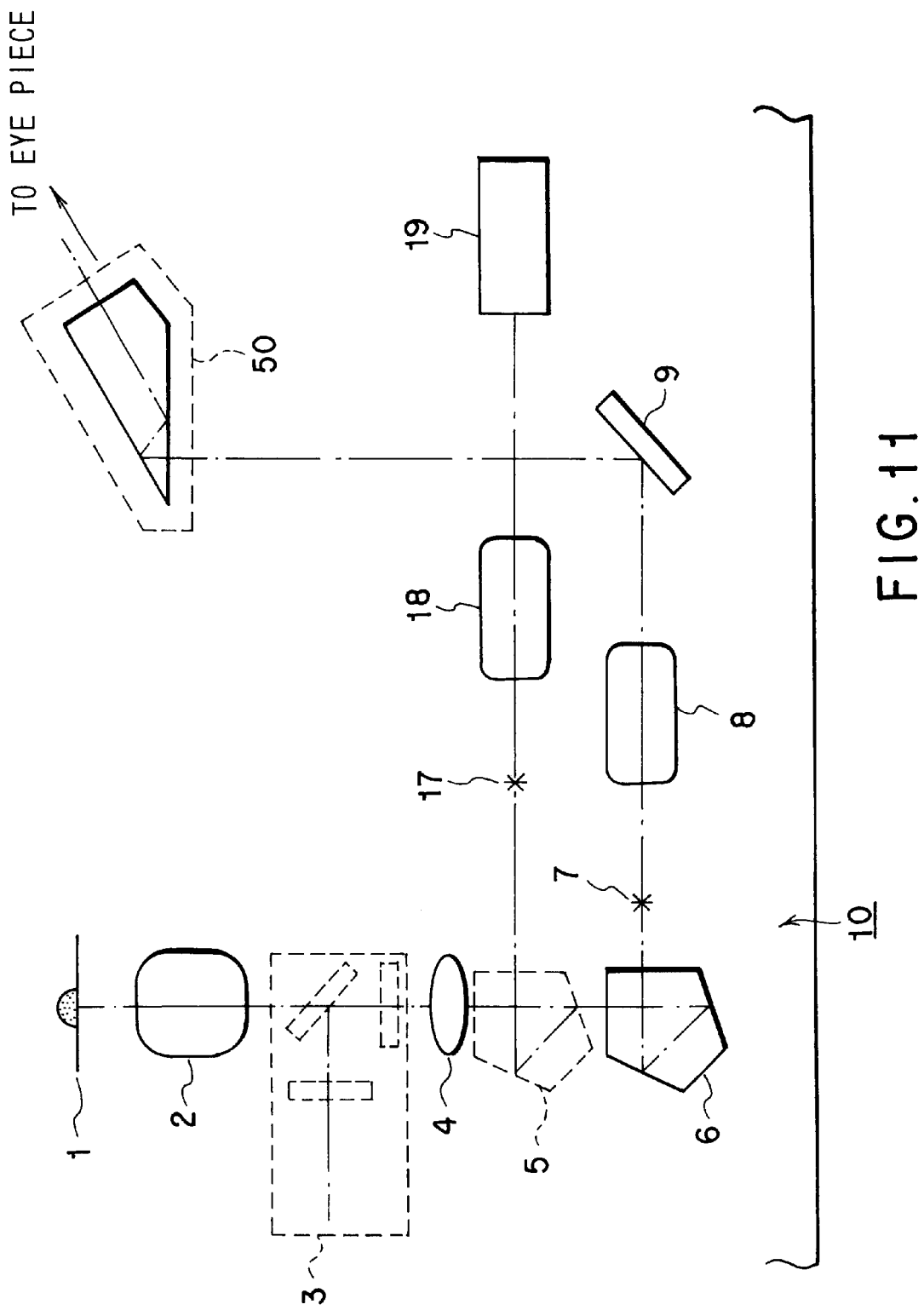
FIG. 11 shows the constitution of an inverted microscope before a confocal scanner unit is attached thereto in the sixth embodiment according to the present invention.
Figure 12:
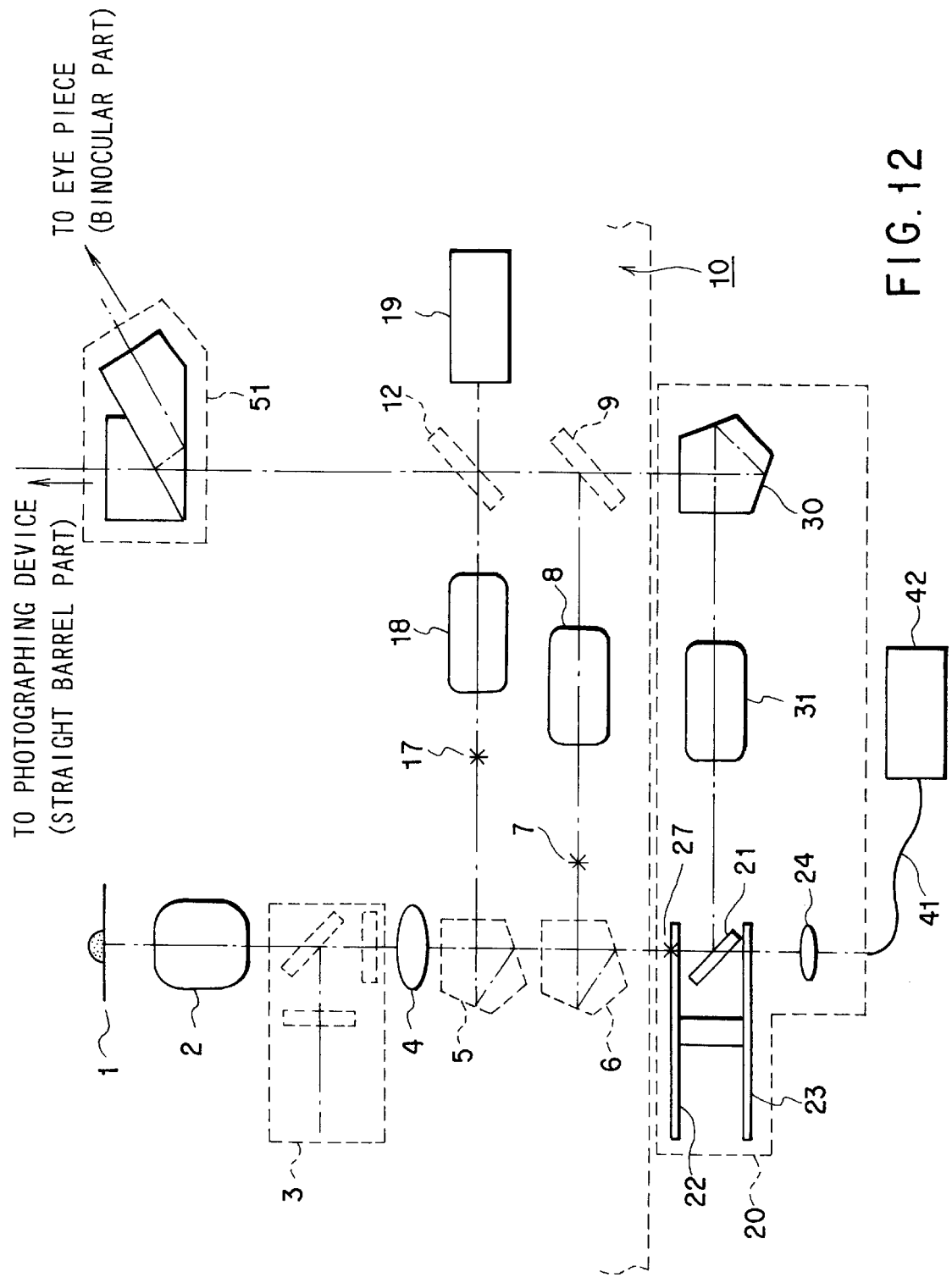
FIG. 12 shows the constitution of the inverted microscope after the confocal scanner unit has been attached thereto in the seventh embodiment according to the present invention.

FIGS. 11 and 12 show an inverted microscope in the sixth embodiment according to the present invention. FIG. 11 is a schematic block diagram showing a state in which a confocal scanner unit is not attached to the microscope and FIG. 12 is a schematic block diagram showing a state in which the confocal scanner unit is attached thereto. The microscope shown in FIG. 11 has a U-shaped observation optical path as in the case of the second embodiment. The same constituent elements as those in the second embodiment are denoted by the same reference symbols and the detailed description of the elements will be not given herein.

In the sixth embodiment, a pentaprism 6 and a mirror 9 are arranged to be detachable from an optical path. The pentaprism 6 is detached from the optical path while a pentaprism 5 is switched over to a transmission prism (not shown). By doing so, an image-formation optical path formed by an objective lens 2 and an image-formation lens 4 goes outside of an observation adapter (not shown) right under the objective lens 2 and provided at the bottom of a microscope main body 10, and can form a sample image on an image surface 27 (FIG. 12).

In the sixth embodiment, a confocal scanner unit 20 is arranged so that a pinhole disk 22 coincides with the position of the image surface 27 as shown in FIG. 12. With this constitution, a confocal image obtained by fluorescent light emitted from a sample 1 is reflected by a dichroic mirror 21 arranged between the pinhole disk 22 and a light condensing disk 23 once, separated from a laser optical path, directed upperright in FIG. 12, reflected by a pentaprism 30 through a relay lens 31, folded upward and led to an observation optical path from an opening (not shown) provided in the lower portion of the mirror 9. Then, the confocal image is led to a trinocular barrel 51 and projected onto the image surface of an eye piece which is not shown in FIG. 12 and arranged at a binocular part or onto the image surface of an image pick-up device connected to a straight barrel part. As a result, an observer can macroscopically observe the confocal image of the sample 1 at an angle of depression of 30 degrees from the binocular barrel part on the front surface of the microscope.

Also, the confocal image can be picked up by the image pick-up device attached to the straight barrel part of the trinocular barrel 51 as necessary. In this case, the optical path length from the image surface 7 on the observation optical path to the image surface within the trinocular barrel differs greatly from that from the image surface 27 on the optical path from the bottom of the microscope main body 10 to the image surface within the binocular barrel. However, the relay lens 31 is provided in the confocal scanner unit 20 irrespectively of the relay lens 8 on the observation optical path, thereby an image-formation relationship can be maintained.

With this constitution, it is possible to obtain a microscope to which a confocal scanner unit can be detachably attached and which can be handled in a state in which the unit is attached thereto with the same operability as that when the unit is not attached.

It is noted that the present invention should not be limited to the first to sixth embodiments stated so far and can be modified in various manners to the extent that the concept of the present invention is not changed.

For example, the pinhole disk 22 having pinholes and the confocal scanner unit 20 having the light condensing disk 23 provided with microlens are employed in all of the above-stated embodiments. If the light condensing disk 23 provided with microlenses is used, a light source needs to be directed in a single direction and laser needs to be employed. If so, the microscope is not suited for color observation. Considering this, therefore, by using a combination of a rotary pinhole plate and a white color light source without a light condensing disk, a reflected confocal image of, for example, a metal sample or an IC can be macroscopically observed in a real time manner and color observation can be, therefore, made. In addition, the pinhole disk may not necessarily be a rotary Nipkow's disk and may be one capable of on/off controlling the opening electro-optically. For example, the present invention is applicable to a case where a confocal image is obtained by a random pinhole pattern using a device such as a liquid crystal display device.

Moreover, a plate provided with pinholes may not necessarily be a disk-shaped plate and can be a cylindrical plate or a belt-shaped plate.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An inverted microscope that reflects an observation light passing through an image-formation optical system upward using at least one reflection optical system and that leads the observation light to an observation optical path, said inverted microscope comprising:

a confocal scanner arranged at an image surface position of the image-formation optical system;

a light source for applying a light onto a sample through the confocal scanner and the image-formation optical system;

a confocal image formation optical system that leads the light passing through the confocal scanner to the sample through the image-formation optical system, returns a return light from the sample to the confocal scanner along a route opposite to that for leading the light to the sample, and obtains a confocal image; and a confocal observation optical system for leading the return light from the sample passing through the confocal scanner to the observation optical path.

2. An inverted microscope according to claim 1, wherein the confocal image formation optical system is provided between the image-formation optical system and a reflection optical system to be freely insertable and detachable and includes a first optical path branching optical system forming a branching optical path; and the confocal scanner is provided on a branching optical path formed by the first optical path branching optical system.

3. An inverted microscope according to 2, wherein the confocal observation optical system comprises:

a second optical path branching optical system for leading a light passing through the confocal scanner from the scanner to the observation optical system; and a third optical path branching optical system putting the light branched by the second optical system on the observation optical path.

4. An inverted microscope according to claim 3, wherein a frequency of reflection of light by the first to third optical path branching optical systems is set at even-number times.

5. An inverted microscope according to claim 1, wherein the confocal scanner is provided on an observation optical path formed by the reflection optical system.

6. An inverted microscope according to claim 5, wherein the confocal observation optical system comprises:

a first optical path branching optical system for branching a return light returning from the sample and passing through the confocal scanner so as to deviate the return light from the observation optical path; and a second optical path branching optical system putting again the light branched by the second optical system on the observation optical path.

7. An inverted microscope according to claim 6, wherein a frequency of reflection of light by the first optical path branching optical system and second optical path branching optical path is set at even-number times.

8. An inverted microscope according to claim 1, wherein the reflection optical system is formed such that an inclined angle of the reflection optical system can be changed to thereby reflect the return light from the sample on an additional optical path; and the confocal scanner is provided at an image surface position on the additional optical path.

9. An inverted microscope according to claim 1, wherein the confocal scanner is provided below the reflection optical system; and the reflection optical system is formed to deviate from the optical path of the return light from the sample.

10. An inverted microscope according to claim 6, wherein the confocal observation optical system comprises:

a first optical path branching optical system for leading the light passing through the confocal scanner to the observation optical path; and a second optical path branching optical system putting light branched by the second optical path branching optical system on the observation optical path.

11. An inverted microscope according to claim 7, wherein a frequency of reflection of light by the first and second optical path branching optical systems is set at even-number times.

12. An inverted microscope according to claim 7, wherein the confocal scanner and the first and second optical path branching optical systems are detachably attached on an outer surface of a microscope main body.

13. An inverted microscope according to claim 1, wherein the confocal scanner is provided within a microscope main body at an image surface position closest to the image-formation optical system.

14. An inverted microscope according to claim 1, wherein the light reflected by the reflection optical system is led through the observation optical path to an eyepiece and is macroscopically observable.

* * * * *

UNITED STATES PATENT AND TRADEMARK OFFICE
CERTIFICATE OF CORRECTION

PATENT NO.    : 6,297,904 B1
DATED         : October 2, 2001
INVENTOR(S)   : Hisao Kitagawa It is certified that error appears in the above-identified patent and that said Letters Patent is hereby corrected as shown below:

Title page,
Item [56], References Cited, OTHER PUBLICATIONS,
insert -- YOKOGAWA ELECTRIC CORPORATION, Tokyo, Japan: News Release dated July 25, 1997 --

Signed and Sealed this

Ninth Day of September, 2003

JAMES E. ROGAN
*Director of the United States Patent and Trademark Office*